United States Patent
Gautam et al.

(10) Patent No.: US 8,949,733 B1
(45) Date of Patent: Feb. 3, 2015

(54) SYSTEM, METHOD, AND COMPUTER PROGRAM FOR DISPLAYING A SUBSET OF A PLURALITY OF FIELDS TO A USER

(75) Inventors: Amit Kr. Gautam, Jagadhari (IN); Ajay Kr. Gautam, Ambala (IN)

(73) Assignee: Amdocs Software Systems Limited, Dublin (IE)

(*) Notice: Subject to any disclaimer, the term of this patent is extended or adjusted under 35 U.S.C. 154(b) by 619 days.

(21) Appl. No.: 13/192,377

(22) Filed: Jul. 27, 2011

(51) Int. Cl.
*G06F 3/048* (2013.01)

(52) U.S. Cl.
USPC ............................................ 715/780; 715/786

(58) Field of Classification Search
CPC ...... G06F 3/048; G06F 3/0237; G06F 17/243
USPC ................................................. 715/786, 780
See application file for complete search history.

(56) References Cited

U.S. PATENT DOCUMENTS

| | | | |
|---|---|---|---|
| 6,345,273 B1 | 2/2002 | Cochran | |
| 7,577,907 B2 | 8/2009 | Vishnia-Shabtai et al. | |
| 2006/0106897 A1* | 5/2006 | Sapozhnikov et al. | 707/204 |
| 2006/0159345 A1* | 7/2006 | Clary et al. | 382/186 |
| 2008/0112488 A1* | 5/2008 | Pearson et al. | 375/240.16 |
| 2011/0185314 A1* | 7/2011 | Sahai et al. | 715/838 |

OTHER PUBLICATIONS

Microsoft Dynamics CRM, CRM Customer Service Software & Solutions, retrieved from http://crm.dynamics.com/en-us/customer-service on Jul. 27, 2011.

* cited by examiner

*Primary Examiner* — Andrea Leggett
(74) *Attorney, Agent, or Firm* — Zilka-Kotab, PC

(57) ABSTRACT

A system, method, and computer program product are provided for displaying a subset of a plurality of fields to a user. In use, a plurality of fields for receiving input from a user is retrieved. Additionally, the plurality of fields is displayed to the user in a first window of a display. Further, a subset of the plurality of fields is displayed to the user in a second window of the display separate from the first window, where the second window is positioned according to a span of vision and an angle of vision of the user.

20 Claims, 5 Drawing Sheets

SYSTEM, METHOD, AND COMPUTER PROGRAM FOR DISPLAYING A SUBSET OF A PLURALITY OF FIELDS TO A USER

FIELD OF THE INVENTION

The present invention relates to user interfaces, and more particularly to programs for receiving user input.

BACKGROUND

Manual data entry utilizing a computer interface remains an important business aspect. For example, users may manually input data into a computer system utilizing a graphical user interface. Unfortunately, conventional interfaces for assisting a user in manually inputting data have exhibited various limitations.

For example, current interfaces fail to deal with complications that may arise while manually inputting data. More specifically, upon correcting an error with previously entered data, the user that entered the data may be required to move their eyes outside of their current span of vision, which may result in a loss of focus and a reduced capability to perform manual data entry. There is thus a need for addressing these and/or other issues associated with the prior art.

SUMMARY

A system, method, and computer program product are provided for displaying a subset of a plurality of fields to a user. In use, a plurality of fields for receiving input from a user is retrieved. Additionally, the plurality of fields is displayed to the user in a first window of a display. Further, a subset of the plurality of fields is displayed to the user in a second window of the display separate from the first window, where the second window is positioned according to a span of vision and an angle of vision of the user.

DETAILED DESCRIPTION

Figure 1:
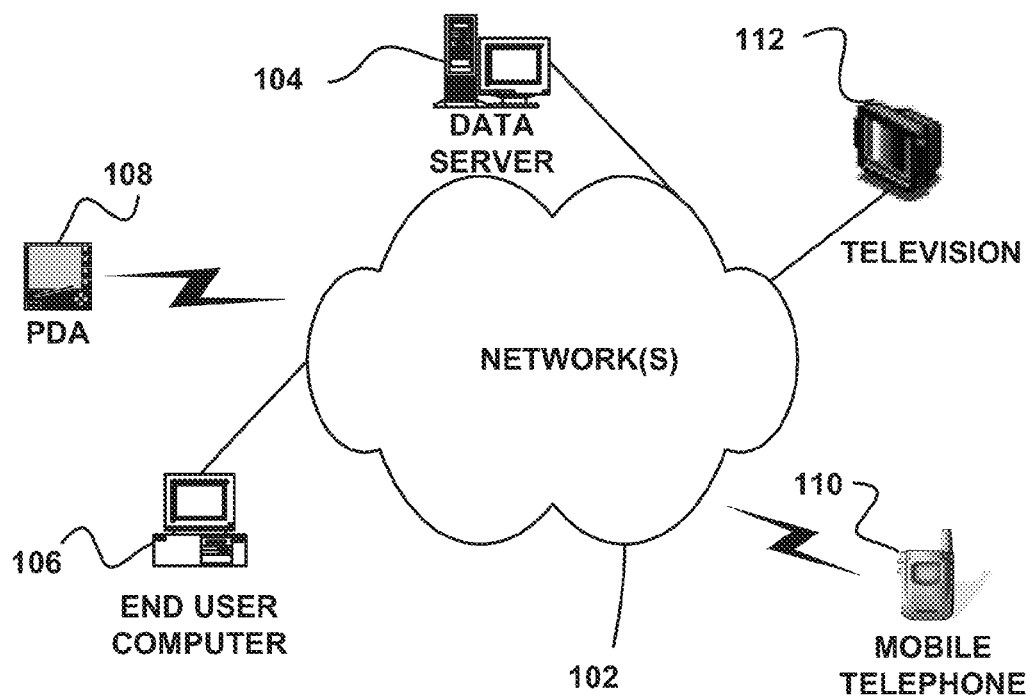
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
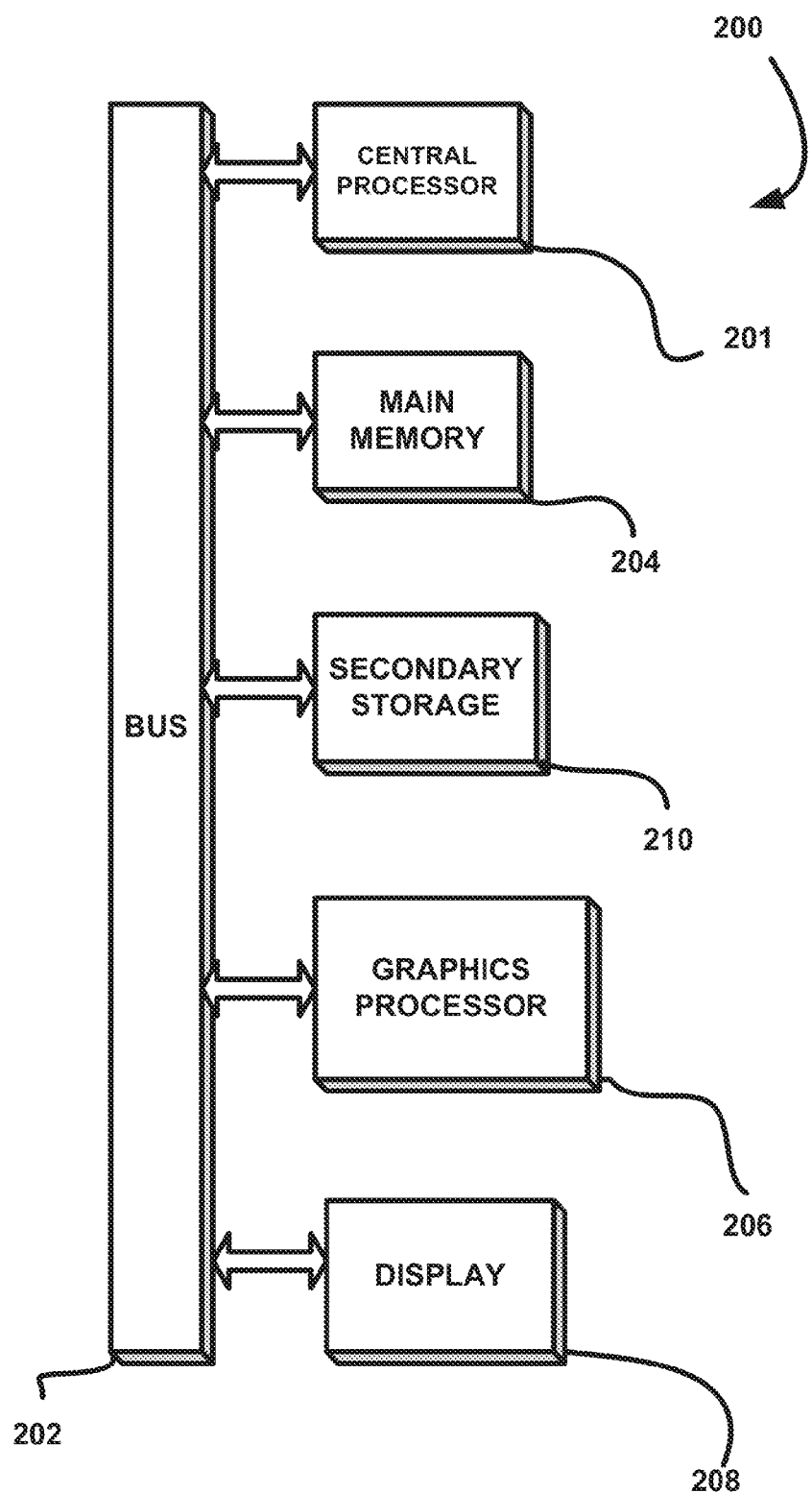
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
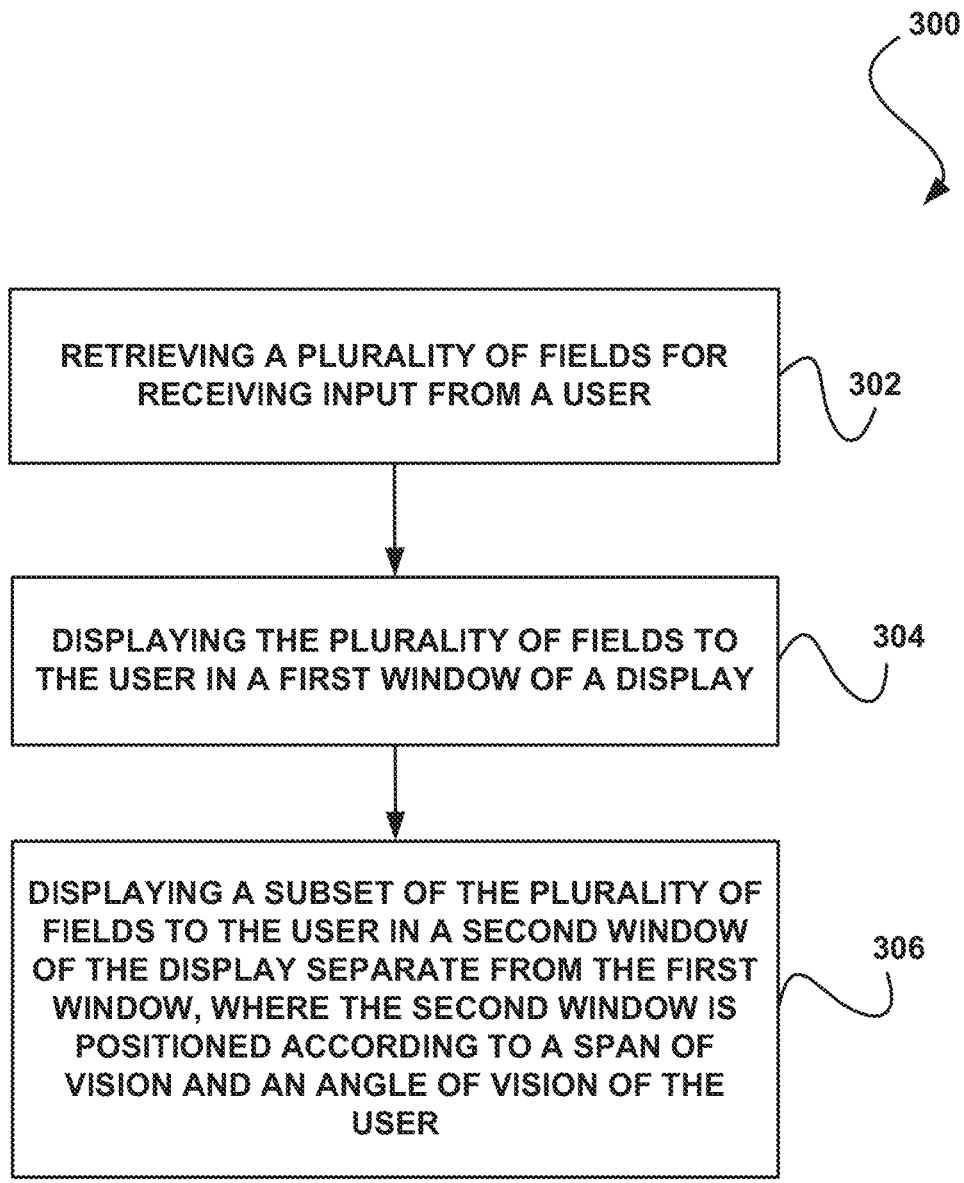
FIG. 3 illustrates a method for displaying a subset of a plurality of fields to a user, in accordance with one embodiment.

FIG. 3 illustrates a method 300 for displaying a subset of a plurality of fields to a user, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a plurality of fields for receiving input from a user is retrieved. In one embodiment, the plurality of fields may include one or more text entry fields. For example, the plurality of fields may include one or more fields for receiving alphanumeric text from the user. In another embodiment, the plurality of fields may include one or more selectable fields. For example, the plurality of fields may include a drop-down option field where the user may select one or more options provided by the field. In another example, the plurality of fields may include one or more selection boxes (e.g., check boxes, etc.) that may be selected by the user (e.g., by selecting the box utilizing a mouse icon, etc.).

Additionally, in one embodiment, metadata may be associated with one or more of the plurality of fields. For example, each of the plurality of fields may have associated metadata that describes one or more elements of the field (e.g., a name of the field, a type of the field, a category associated with the field, other fields associated with the field, etc.). In another embodiment, the plurality of fields may be associated with a customer relationship management (CRM) application. For example, the plurality of fields may be fields used within a data form of the CRM application. In yet another embodiment, the plurality of fields may be retrieved from a database. In still another embodiment, the plurality of fields may be associated with a template (e.g., a template for a particular type of customer, etc.).

Further, as shown in operation 304, the plurality of fields is displayed to the user in a first window of a display. In one embodiment, the first window may be displayed to the user in response to the user selecting a file associated with the first window from a menu. In another embodiment, the first window may be part of a graphical user interface (GUI) used by the user to input data. In yet another embodiment, the plurality of fields may be displayed according to a predetermined layout (e.g., a layout associated with a particular entity, etc.).

In still another embodiment, the plurality of fields may be organized according to one or more categories within the first window of the display. For example, the plurality of fields may be categorized by field type, by subject, etc. Also, in one embodiment, the one or more categories within the first window of the display may be labeled.

Further still, in one embodiment, the display may include a computer monitor, a television, a portable electronic device display, etc. In another embodiment, the user may include an employee tasked with retrieving information from one or more entities. For example, the user may include a customer service representative (CSR), etc.

In yet another embodiment, the plurality of fields may be displayed simultaneously within the first window. For example, all of the plurality of fields may be visible to the user from within the first window. In still another embodiment, the plurality of fields may be displayed on multiple pages of the first window and may be visible to the user from within the first window, utilizing a scroll bar within the first window.

Also, as shown in operation 306, a subset of the plurality of fields is displayed to the user in a second window of the display separate from the first window, where the second window is positioned according to a span of vision and an angle of vision of the user. In one embodiment, the subset of the plurality of fields may include the fields that are currently being addressed by the user. For example, the subset of the plurality of fields may include fields within the first window that have not yet been populated by the user.

In another example, the subset of the plurality of fields may include fields within the first window that are situated subsequent to fields within the first window that have been populated by the user. In yet another example, the subset of the plurality of fields may include fields within the first window that are most frequently referenced by the user. In still another example, the subset of the plurality of fields may include fields that are associated with a field that is currently receiving input from the user.

In addition, in one embodiment, the subset of the plurality of fields may include a predetermined number of fields. For example, the subset of the plurality of fields may include a predetermined number of fields ordered chronologically with respect to their location within the first window. In another embodiment, the subset of the plurality of fields may include fields located within a particular section of the first window.

Further, in one embodiment, the subset of the plurality of fields displayed to the user in the second window may be altered according to one or more actions of the user. For example, when a field within the second window is populated by the user, the field may be removed from the second window, and a subsequent unpopulated field from the first window may then be added to the second window. In this way, the user may only need to view the second window in order to interact with the plurality of fields as the fields are being populated.

In another embodiment, the user may be able to navigate through the plurality of fields in the first or second window by performing one or more actions (e.g., by pressing a key on a keyboard ("auto-tabbing," etc.), selecting a field using a mouse icon, etc.). In yet another embodiment, the second window may include a no-scroll window. For example, the second window may not include scrolling functionality by presenting all of the plurality of fields to the user without the user having to scroll through the second window.

Further still, in one embodiment, one or more of the size and location of the second window may be assigned by the user. For example, the user may assign the size and location of the second window according to the span of vision and the angle of vision that is determined to be comfortable to the user. In this way, the second window may be located at a location on the display that is optimized for the user, such that the user may be able to look at the same location within the display while interacting with the plurality of fields.

Also, in one embodiment, the second window may be overlaid on top of the first window, such that a portion of the first window may be viewed behind the second window. In another embodiment, the user may switch between the first window and the second window. For example, the user may switch between the first window and the second window using a keyboard command, by selecting one or more options within the first and/or second window, etc.

Additionally, in yet another embodiment, a search may be performed on one or more of the plurality of fields, utilizing one or more of the first window and the second window. For example, the second window may include a search field, where the user may enter a query (e.g., one or more alphanumeric search terms, etc.). In another example, the plurality of fields (or a subset thereof) may be searched, utilizing the query input by the user.

In another embodiment, the search may be performed utilizing metadata associated with the plurality of fields. For example, the query entered by the user may be compared against the metadata, and matches between the query and metadata may be displayed (e.g., displayed within the second window, displayed within the first window, etc.). In yet another embodiment, the results of the search may be highlighted. For example, an icon (e.g., an icon indicating the start of data entry, etc.) may be placed within the first of one or more results of the search, such that the user may be able to enter data into the first field resulting from the search after the search is performed.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
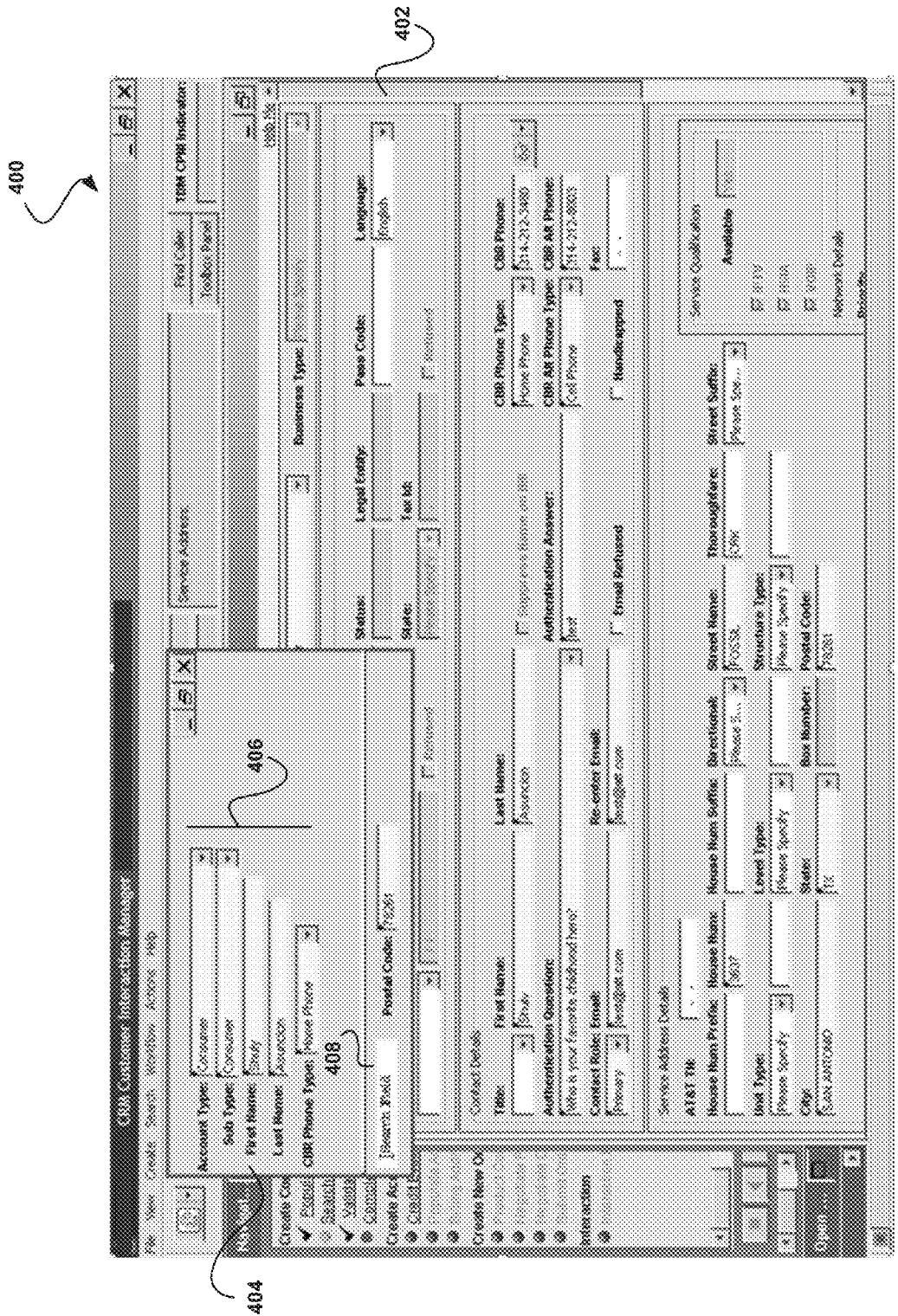
FIG. 4 illustrates an exemplary CRM application, in accordance with another embodiment.

FIG. 4 illustrates an exemplary CRM application 400, in accordance with another embodiment. As an option, the application 400 may be implemented in the context of the details of FIGS. 1-3. Of course, however, the application 400 may be implemented in any desired environment. Further, the aforementioned definitions may equally apply to the description below.

As shown, the application 400 displays a main window 402 (e.g., a data input form, etc.) as well as a span of vision window 404, where the span of vision window 404 overlaps the main window 402. In one embodiment, a user may be able to switch between the main window 402 and the span of vision window 404. For example, after entering data in the span of vision window 404, the user may access one or more fields in the main window 402.

In another embodiment, when accessing the main window 402, the main window 402 may overlap the span of vision window 404. In still another embodiment, when accessing the main window 402, the span of vision window 404 may still overlap the main window 402. Of course, however, the main window 402 and the span of vision window 404 may be situated in any manner.

Additionally, the span of vision window 404 includes a plurality of fields 406. In one embodiment, the plurality of fields 406 may correspond to a subset of all fields found within the main window 402. In another embodiment, the plurality of fields 406 may include one or more of current fields, fields that are most frequently referenced, a history of fields, dependent fields, etc. In yet another embodiment, at any given point in time the placement of the plurality of fields 406 may not change, such that a user may know where to look for particular fields at all points in time.

In another embodiment, as the user populates one or more of the plurality of fields 406, the one or more fields may be removed from the span of vision window 404, and the data populated in those fields by the user may be added to the corresponding field within the main window 402. In yet another embodiment, one or more unpopulated fields may be added to the span of vision window 404 from the main window 202 to replace the removed populated fields. In another embodiment, the unpopulated fields may be located within the main window 402 after the last field that was added to the span of vision window 404.

In this way, a static view of the main window 402 may be provided to the user by the span of vision window 404. For example, instead of a cursor moving between fields of the main window 402 as the user enters data, the fields 406 may move within the span of vision window 404. In another example, while entering data utilizing the application 400, the main window 402 may scroll up or down (e.g., in response to the entry of data into one or more fields of the main window 402, etc.), but the location of the span of vision window 404 may remain static. In this way, instead of auto-tabbing the main window 402, fields may be dynamically replaced within the span of vision window 404 as the user enters data into the fields, such that the user may not have to track a cursor to know where the current position for entering data is placed.

Also, in one embodiment, the main window 402 may include one or more dependent fields (e.g., a field that is linked to another field of the main window 402, etc.). In another embodiment, if one of the fields 406 within the span of vision window 404 is a dependent field, and the user populates such dependent field with data, then all corresponding dependent fields within the main window 402 may be populated with the same data. In another embodiment, the main window 402 may include one or more disabled fields (e.g., one or more fields that do not allow the input of data by the user, etc.). In yet another embodiment, only fields within the main window 402 that are not disabled may be shown within the fields 406 within the span of vision window 404.

In this way, only relevant fields that may be populated may be presented to the user within the span of vision window 404, such that the fields presented within the span of vision window 404 may not require additional filtering.

Further, the span of vision window 404 includes a search field 408. In one embodiment, the user may enter a search term into the search field 408, and such search term may be compared against metadata associated with all fields of the main window 402. In another embodiment, the search using the search term may conclude with one or more results, where the results may include one or more fields of the main window 402. In yet another embodiment, if the results include one or more fields of the main window 402, such fields may be displayed within the span of vision window 404.

In this way, the user may be able to search the fields of the main window 402 by name, and when a field is found, such field may be shown within the span of vision window 404 with focus on it (e.g., with a data insertion icon placed within the field, etc.) such that the user may start populating the field immediately.

Further still, the location of the span of vision window 404 may be adjusted by the user (e.g., according to the user's preferences, etc.). In one embodiment, the location of the span of vision window 404 may be adjusted according to a span and angle of vision of the user that is determined to be comfortable by the user. For instance, the span and angle of vision of the user may include a vertical and horizontal angular span within which one or more eyes of the user have sharp enough vision to read text. In one embodiment, this vertical and horizontal span may be calculated from a particular position of the one or more eyes of the user with respect to a screen displaying the application 400.

In this way, the span of vision window 404 may take into account principles of cognitive science to reduce eye movement and may configure the screen to the user's span of vision, while maintaining a static view of the span of vision window 404. Additionally, the span of vision window 404 may not have a scroll bar and may illustrate a minimal set of fields 406 that may be most relevant to the user at a given instance of time. Further, an average handle time (AHT) associated with an average interaction between the user and another entity (e.g., a customer, etc.) may be minimized, which may lead to an improved total time to completion.

Figure 5:
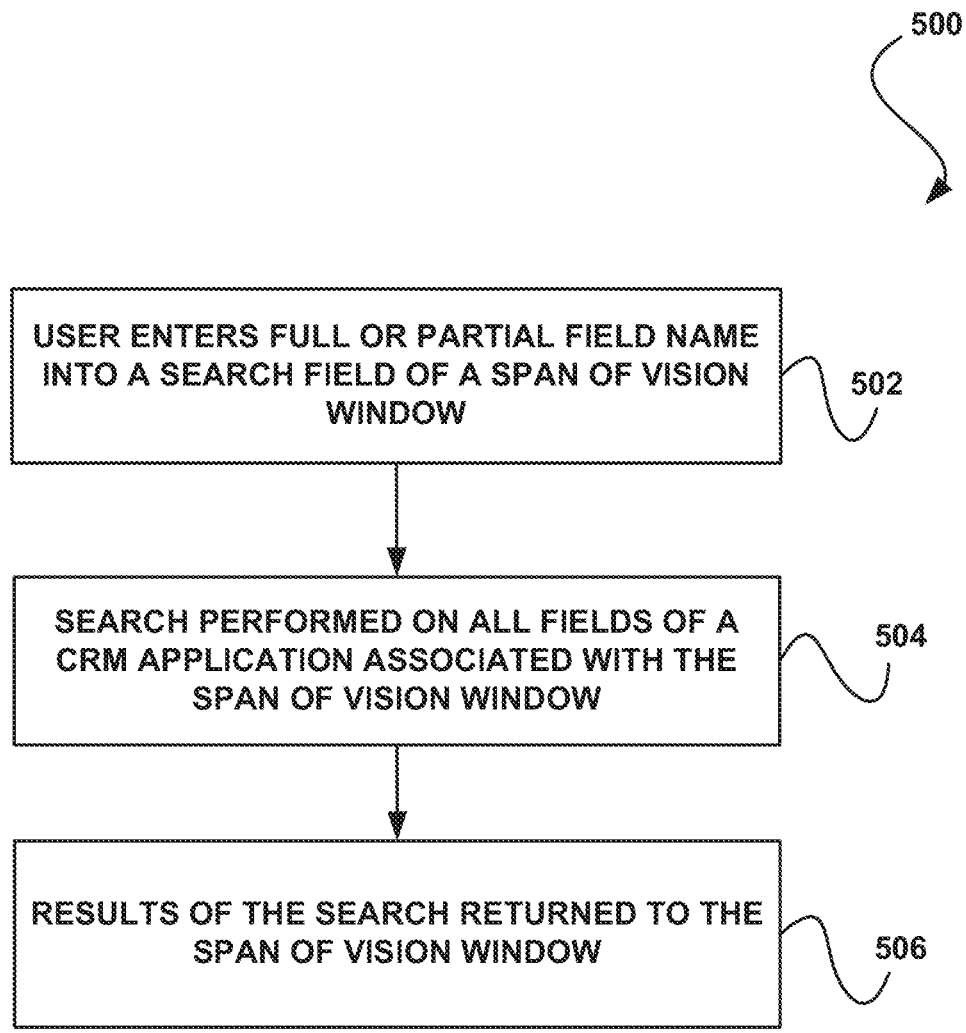
FIG. 5 illustrates a method for performing a field search, in accordance with another embodiment.

FIG. 5 illustrates a method 500 for performing a field search, in accordance with another embodiment. As an option, the method 500 may be implemented in the context of the details of FIGS. 1-4. Of course, however, the method 500 may be implemented in any desired environment. Further, the aforementioned definitions may equally apply to the description below.

As shown in operation 502, a user enters a full or partial field name into a search field of a span of vision window. Additionally, as shown in operation 504, a search is performed on all fields of a CRM application associated with the span of vision window. In one embodiment, the span of vision window may be displayed as part of a CRM application, where the CRM window overlaps a larger window that includes a plurality of searchable fields.

In another embodiment, each field associated with the CRM application may include one or more metadata elements describing the field. For example, each field associated with the CRM application may include one or more metadata elements describing a title of the field, one or more descriptors of the field, one or more associated fields, etc. In yet another embodiment, performing the search on all the fields may include comparing the full or partial field name entered by the user to the metadata elements associated with the plurality of the fields.

Also, in one embodiment, performing the search may include searching for fields similar, hut not necessarily exact, to the full or partial fields name entered by the user. For example, a search may be performed for all fields dose to the entered full or partial field name. Further, as shown in operation 506, results of the search are returned to the span of vision window. In this way, the user may be able to search for and edits fields without having to move back and for the between pages of the CRM application.

Additionally, in another embodiment, the user may be able to make corrections to one or more fields on the fly and may be able to follow a path to completion preferred by a caller interacting with the user. For example, a caller (e.g., a customer, etc.) interacting with the user may desire to provide a second set of information before a first set of information, where the second set of information is located after the first set of information (e.g., on a different page, on a different section, etc.) within a main page of the CRM application.

Further, the user (e.g., a customer service representative (CSR), etc.) may search for the second set of information within the span of vision window. Further still, the user may use the results of the search to populate the second set of information before the first set of information. In this way, the user's focus may be maintained, and time spent populating fields of the CRM application may be reduced.

Further, in one embodiment, validation handling may be performed within dependent fields of the CRM application. For example, during the course of populating fields within the CRM application, if any validations are broken (e.g., if a field is populated with information that conflicts with a dependent field, if a field is populated with incorrect data, etc.), the user may be warned in the span of vision window (e.g., by an alert, a sound, etc.). In another embodiment, the one or more fields that are associated with the broken validation may be presented to the user within the span of vision window.

Also, in one embodiment, interfaces for CRM applications may be designed so as to enable a customer representative to capture more and more information in as little time as possible. Various techniques as auto-population, auto-tabbing, etc. may be employed to realize this design requirement. A principle that may form a foundation of many such techniques is "minimization of eye ball movement." In another embodiment, "moving fields" such as a span of vision window may be used to minimize eye movement. This may in turn heighten a customer representative's ability to focus on a call and capture details faster.

Further still, in another embodiment, listening to a call and simultaneously recording details may be a complex activity that may require collaboration between the eyes, ears, hands and brain of a user. For example, a CSR may realize that a field that was populated earlier had a typing error or when additional data needs to be added to a pre-populated field, or even in a case where caller corrects himself on some information that he had given a while back, and the CSR may therefore be required to move their eye focus back to the field which may need correction.

Additionally, in one embodiment, reducing additional eye movements of a user not only reduces the total time taken for capturing the information (e.g., "time to completion," etc.), but may increase the capability of the CSR to simultaneously focus on the call, which may minimize further repetitions from the caller.

Further, in another embodiment, each individual user may have a different span of vision which they are comfortable to work with. In yet another embodiment, at any given point of time an individual may see (and may meaningfully analyze) only a very small portion of the entire screen. Further still, in another embodiment, not all callers may want to follow the same "path to completion" for the data input form.

Further still, in one embodiment, the aforementioned technique may minimize eye movements and reduce "time to completion" by employing instantaneous and direct access to all fields of the data input form (e.g., fields residing on any page of application, etc.) and by dynamically accommodating currently relevant fields in a user defined span of vision.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising:
   computer code for retrieving a plurality of fields for receiving input from a user;
   computer code for displaying the plurality of fields to the user in a first window of a display; and
   computer code for displaying a subset of the plurality of fields to the user in a second window of the display separate from the first window, where a location of the second window is selected by the user and remains visible and in a static location while the user adjusts a location of one or more of the plurality of fields displayed in the first window;
   wherein the computer program is operable such that when a field within the second window is populated by the user, the field is removed from the second window, and a subsequent unpopulated field from the first window is then added to the second window.

2. The computer program of claim 1, wherein metadata is associated with one or more of the plurality of fields.

3. The computer program of claim 1, wherein each of the plurality of fields has associated metadata that describes one or more elements of the field.

4. The computer program of claim 1, wherein the plurality of fields are fields used within a data form of a customer relationship management (CRM) application.

5. The computer program of claim 1, wherein the first window is part of a graphical user interface (GUI) used by the user to input data.

6. The computer program of claim 1, wherein the plurality of fields are organized according to one or more categories within the first window of the display.

7. The computer program of claim 1, wherein the plurality of fields are displayed on multiple pages of the first window and are visible to the user from within the first window, utilizing a scroll bar within the first window.

8. The computer program of claim 1, wherein the subset of the plurality of fields includes fields within the first window that have not yet been populated by the user.

9. The computer program of claim 1, wherein the subset of the plurality of fields includes fields within the first window that are situated subsequent to fields within the first window that have been populated by the user.

10. The computer program of claim 1, wherein the subset of the plurality of fields includes fields within the first window that are most frequently referenced by the user.

11. The computer program of claim 1, wherein the subset of the plurality of fields includes fields that are associated with a field that is currently receiving input from the user.

12. The computer program of claim 1, wherein the subset of the plurality of fields includes a predetermined number of fields ordered chronologically with respect to their location within the first window.

13. The computer program of claim 1, wherein the second window does not include scrolling functionality and presents all of the subset of the plurality of fields to the user without the user having to scroll through the second window.

14. The computer program of claim 1, wherein the computer program is operable such that the user assigns a size and a location of the second window according to a span of vision and an angle of vision that is determined to be comfortable to the user.

15. The computer program of claim 1, wherein the second window includes a search field, where the user enters a query.

16. The computer program of claim 15, wherein the query entered by the user is compared against metadata, and matches between the query and the metadata are displayed within the second window.

17. The computer program of claim 1, further comprising:
computer code for receiving a search term entered into a search field of the second window by the user;
computer code for comparing the search term against metadata associated with each of the plurality of fields in the first window; and
computer code for identifying one or more results of the comparing, the results including the subset of the plurality of fields.

18. A method, comprising:
retrieving a plurality of fields for receiving input from a user;
displaying the plurality of fields to the user in a first window of a display; and
displaying a subset of the plurality of fields to the user in a second window of the display separate from the first window, where a location of the second window is selected by the user and remains visible and in a static location while the user adjusts a location of one or more of the plurality of fields displayed in the first window;
wherein when a field within the second window is populated by the user, the field is removed from the second window, and a subsequent unpopulated field from the first window is then added to the second window.

19. A system, comprising:
a processor for:
retrieving a plurality of fields for receiving input from a user;
displaying the plurality of fields to the user in a first window of a display; and
displaying a subset of the plurality of fields to the user in a second window of the display separate from the first window, where a location of the second window is selected by the user and remains visible and in a static location while the user adjusts a location of one or more of the plurality of fields displayed in the first window;
wherein the system is operable such that when a field within the second window is populated by the user, the field is removed from the second window, and a subsequent unpopulated field from the first window is then added to the second window.

20. The system of claim 19, wherein the processor is coupled to memory via a bus.

* * * * *